United States Patent
Rahgozar et al.

(10) Patent No.: US 6,963,413 B2
(45) Date of Patent: Nov. 8, 2005

(54) SYSTEM AND METHOD FOR SCAN-TO-PRINT ARCHITECTURE

(75) Inventors: M. Armon Rahgozar, Penfield, NY (US); John A. Moore, Rochester, NY (US); Mary Ann Sprague, Macedon, NY (US)

(73) Assignee: Xerox Corporation, Stamford, CT (US)

(*) Notice: Subject to any disclaimer, the term of this patent is extended or adjusted under 35 U.S.C. 154(b) by 964 days.

(21) Appl. No.: 09/742,178

(22) Filed: Dec. 20, 2000

(65) Prior Publication Data

US 2002/0113979 A1 Aug. 22, 2002

(51) Int. Cl.⁷ .................. G06K 15/00; G06F 15/00
(52) U.S. Cl. ............... 358/1.13; 715/505; 715/506; 715/908; 382/217
(58) Field of Search ............... 358/1.13, 1.12; 715/505, 506, 503, 507, 508, 522, 908; 382/217, 209

(56) References Cited

U.S. PATENT DOCUMENTS

| 5,583,656 | A | | 12/1996 | Gandhi et al. | |
| 5,974,401 | A | | 10/1999 | Enomoto et al. | 705/40 |
| 6,012,070 | A | * | 1/2000 | Cheng et al. | 715/505 |
| 6,034,785 | A | * | 3/2000 | Itoh | 358/1.18 |
| 6,157,459 | A | | 12/2000 | Shiota et al. | 385/1.15 |
| 6,327,049 | B1 | * | 12/2001 | Ohtsuka | 358/1.18 |
| 6,469,795 | B2 | * | 10/2002 | Beaudet et al. | 358/1.14 |
| 6,650,433 | B1 | * | 11/2003 | Keane et al. | 358/1.15 |
| 6,728,426 | B1 | * | 4/2004 | Zlotnick | 382/305 |
| 6,771,381 | B1 | * | 8/2004 | Klein | 358/1.15 |
| 2002/0109870 | A1 | | 8/2002 | Moore et al. | |
| 2002/0140825 | A1 | | 10/2002 | Terashita | |
| 2003/0206316 | A1 | * | 11/2003 | Anderson et al. | 358/1.18 |

FOREIGN PATENT DOCUMENTS

| JP | 11331446 8 A | 11/1999 |
| JP | 2000270148 A | 9/2000 |

OTHER PUBLICATIONS

English translation of JP 11-331446.*

* cited by examiner

Primary Examiner—Jerome Grant, II

(57) ABSTRACT

A system and method that enables scan to print services is disclosed. In one embodiment, Document Reproduction System (DRS) has at least one scan to print job template specifying at least one recipient and at least one printing device. A storage pool service is also provided for storing the job template which is accessible by at least one printing device. A scanner is utilized for receiving a digitized version of a document to be manipulated by the specified job template parameters. The DRS performs the specified operations on the digitized document in accordance with the job template parameters and then the document is forwarded to the recipient's designated printing device.

6 Claims, 2 Drawing Sheets

SYSTEM AND METHOD FOR SCAN-TO-PRINT ARCHITECTURE

CROSS REFERENCE TO RELATED APPLICATIONS

Reference is made to commonly-assigned copending U.S. patent application Ser. No. D/A0619Q, filed concurrently herewith, entitled System and Method for Scan-To-Print Architecture, by Moore, et al, the disclosures of which are incorporated herein.

FIELD OF THE INVENTION

The present invention relates to the field of document reproduction systems and methods that enable specified operations to be performed on scanned documents in accordance with specifications designated on a job template and, in particular, to those systems and methods that enable a scanned document to be re-directed to a recipient's designated printing device in compliance with a defined job template.

BACKGROUND OF THE INVENTION

Today's printers utilize a wide range of different printing technologies to make marks on paper, and new approaches are being developed continually. Each technology has its own unique print quality characteristics, and as a result, different printers typically yield different output quality when given the same input data.

In the case of traditional printing, much of the data submitted to a printer was orthographic in origin (computer generated). Typically, orthographic data is described using some sort of PDL (page description language), wherein commands are sent to a RIP (raster image processor) that in return create/render device specific rasters for sending to the print engine. Things like fonts and line graphics are 'tuned' for the specific target printer, and once printed, the raster information is discarded. In this way, the final data that a printer gets is optimized so as to get reasonably consistent output from printers with very different characteristics.

However, with the growing popularity of scanners, digital cameras, and print ready masters used in print-on-demand applications, there is a tremendous amount of reprographic (scanned/pre-rasterized images) data also being sent directly to printers today. Because of the desire to achieve consistent quality from different printers for this type of data as well, many standards have been introduced to allow device independent encoding of reprographic data and/or sophisticated calibration/compensation techniques to quantify and adjust for the inherent differences in various digital imaging system components. These approaches tend to require support from the underlying operating system(s) and extensive computation to achieve the desired goal of device interoperability. Additionally, most of these methodologies do not map easily to a distributed, component based imaging system comprised of diverse products from different vendors.

The present invention seeks to relegate the responsibility for this image quality compensation to a specialized, dedicated service. In this manner, the other components of a distributed system do not have to take any coordinated responsibility for managing the system level image quality factors, and do not necessarily need to conform to any particular standards. The service can use a variety of techniques to keep track of or determine the imaging characteristics of different components in the systems and determine the best way to adjust an image to provide consistent, predicable image quality interoperability between them.

SUMMARY OF THE INVENTION

What is presented is a system and method that enables scan to print services. In one embodiment, Document Reproduction System (DRS) has at least one scan to print job template specifying at least one recipient and at least one printing device. A storage pool service is also provided for storing the job template which is accessible by at least one printing device. A scanner is utilized for receiving a digitized version of a document to be manipulated by the specified job template parameters. The DRS performs the specified operations on the digitized document in accordance with the job template parameters and then the document is forwarded to the recipient's designated printing device. The method of enabling Scan to Print services for a Document Reproduction System (DRS) has the steps of first creating a scan to print job template specifying at least one recipient and at least one printing device. The created job template is then stored preferably in a pool service accessible by at least one output device. The method further includes the step of selecting a job template from said pool service then placing at least one document on the DRS feeder to be scanned into the system. After scanning, the document is operated on by the DRS in accordance with the job template parameters specified therein and then it is forwarded to the recipient's printing device as specified by the job template. In another embodiment, the user selects a job template from a set of pre-defined job templates in accordance herewith.

Other objects, advantages, and salient features of the invention will become apparent from the detailed description which, taken in conjunction with the drawings, disclose the preferred embodiments of the invention.

BRIEF DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which.

DETAILED DESCRIPTION OF THE INVENTION

Figure 1:
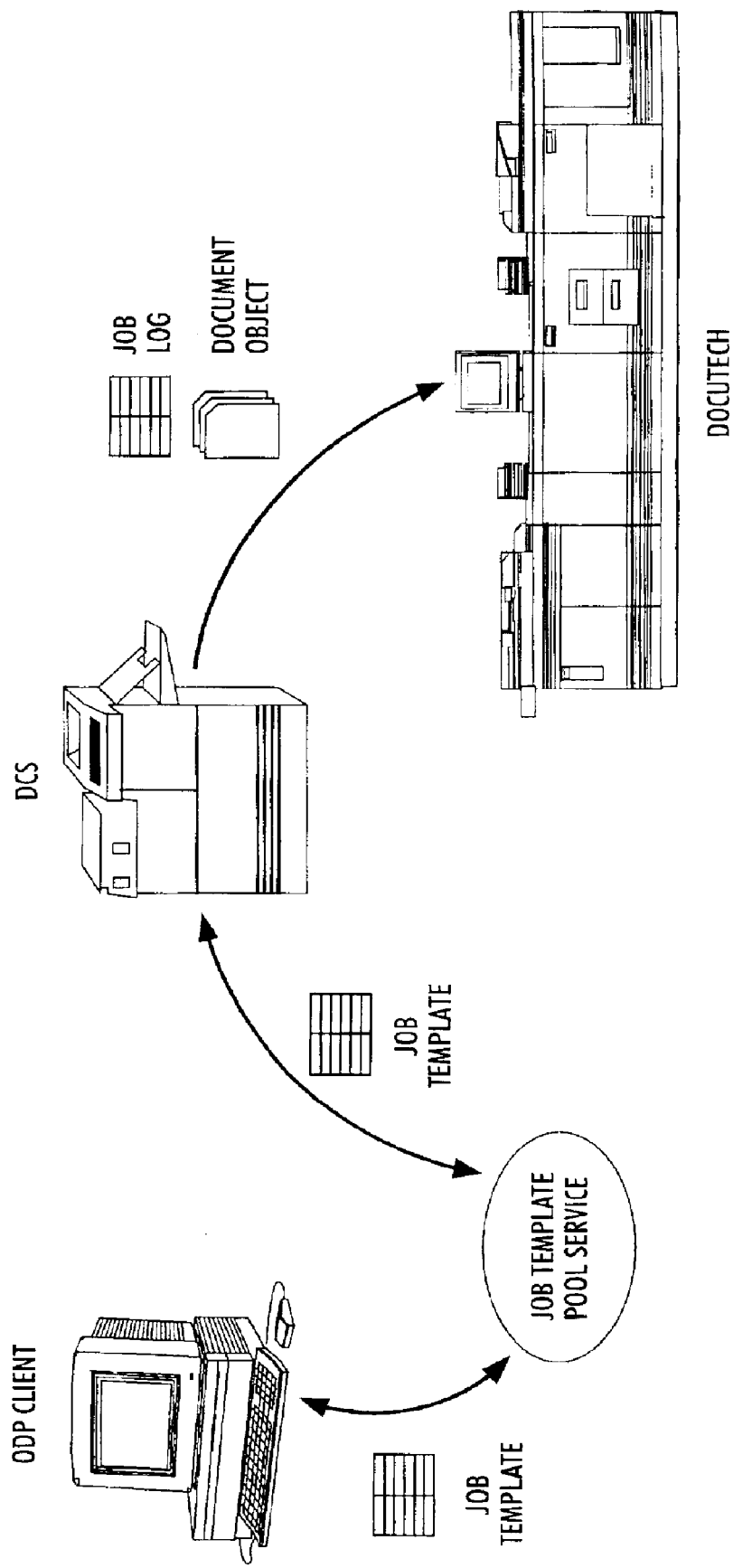
FIG. 1 is a diagram illustrating a Scan to Print solution using a proxy image interoperability server.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

What is disclosed is a system and method which enables scan to print services. In one embodiment, Document Reproduction System (DRS) has at least one scan to print job template specifying at least one recipient and at least one printing device. A storage pool service is also provided for storing the job template which is accessible by at least one printing device. A scanner is utilized for receiving a digitized version of a document to be manipulated by the specified job template parameters. The DRS performs the specified operations on the digitized document in accordance with the job template parameters and then the document is forwarded to the recipient's designated printing device. The method of enabling Scan to Print services for a Document Reproduction System (DRS) has the steps of first creating a scan to print job template specifying at least one recipient and at least one printing device. The created job template is then stored preferably in a pool service accessible by at least one output device. The method further includes the step of selecting a job template from said pool service then placing at least one document on the DRS feeder to be scanned into the system. After scanning, the document is operated on by the DRS in accordance with the job template parameters specified therein and then it is forwarded to the recipient's printing device as specified by the job template. In another embodiment, the user selects a job template from a set of pre-defined job templates in accordance herewith.

The Network Scanning Architecture (NSA) and the Network Image Quality Services (NIQS) provide a platform for the system and method of the present invention with the goal to provide an architecture that leverages existing infrastructure and provides a framework that enables quick implementation with small additional development cost. Although the architecture of the present invention is not bound to a particular implementation, another goal is to present a solution that maximally incorporates the uses of Xerox's ODP Document Centre Systems (DCS) and Docutech's production print systems wherein the use of DCS devices acts as a front end (i.e. scanning) and the use of Docutechs, HP printers as well as DCS devices act as a back end (i.e. printing) for various Scan to Print embodiments hereunder.

Specifically, a user programs a Scan to Print job via a Job Template wherein the content of the Job Template specifies the recipients and/or printers, user preferences for delivery as well as print quality and required confirmation. The client tool stores the Job Templates in a Pool Service accessible by all the DCS devices on the local network. A user walks up to a DCS device and selects a Scan to Print Job Template. The user places the document(s) on the DCS feeder, optionally modifies the job parameters and/or the list of printers and pushes the start button. The DCS scans the document(s) and forwards it to the specified recipients or remote printers. Note that in the model of FIG. 1 it is not required for a typical walk-up user to be familiar with programming Job Templates. Rather, a walk-up user need only to select a pre-defined template, possibly modify some of the job parameters, and then execute Scan to Print. Creating Job templates would preferably be a task only to be performed by a privileged user or system administrators.

The user operational model is the same as the one for all the applications that are built based on the Network Scanning Architecture. Descriptions of other user tasks (i.e. Job Recovery, DCS and Remote Job Status Monitoring) are also similar to the ones discussed in the Network Scanning Architecture.

With copiers, where the scan and the print subsystems are physically coupled, the image quality adjustments are made in a proprietary manner. These adjustments consist of a set of image processing tasks that "tune" the input of the printing subsystem (i.e. the output of the scanning subsystem) to produce the best quality printed output image. The copier system controls the execution of and the "tuning" of the parameters for each task. The parameters are designed knowing the imaging characteristics of both the scanning and printing subsystems and the set of image processing tasks preferably including resolution conversion, halftoning, Tone Reproduction Curve (TRC) correction and color correction, With Scan to Print, the scanning and printing subsystems are de-coupled and distributed on a network. As a result, a user can potentially combine any pair(s) of scanning (e.g. a DCS or a DocuImage 620S) and printing (e.g. a Docutech or a DCS) subsystems to achieve the desired outcome. To achieve image quality guarantees in this model, each pair must be tuned independently. To achieve this, the present invention discloses an Image Interoperability Service (IIS) that "tunes" the scanned image for each pair based on the imaging characteristics of that pair. Specifically, the Image Interoperability Service takes (a) the scanned image, (b) a specification of how the image was scanned and (c) the device profile of the target printing system as input and (d) produces an output image. The Image Interoperability Service generates the output image such that when printed on the target printer it produces an enhanced quality output. The parameters that define the "enhanced print quality" for a printing system are specified by the device profile for that system. Moreover, the Image Interoperability Service typically contains a set of image processing modules and a filter. In one embodiment, it may use these modules to re-sample the scanned image if the resolution of the printing system does not match that of the scanning system, to re-screen the scanned image halftones to the ones that are suitable for printing system, to adjust the color gamut of the scanned image to match that of the printing system or to account for "print black" vs. "print white" features of the printing system by adjusting the TRC of the scanned image. Further, the communication between each pair must be done in an open and non-proprietary manner to insure the extensibility of the model.

The Image Interoperability Service preferably is built using the Network Image Quality Service (NIQS) from ODP. This Image Interoperability service can reside in one of the three logical places in the system. This architecture does not restrict its location and server platform. The IIS may reside: (a) at the scanning subsystem thereby requiring that the scanning subsystem have access to the specified printer subsystems' device profiles wherein the DCS device submits the print job to the specified printer after image quality adjustments; (b) at the printing subsystem thereby requiring that the printing subsystem have access to both the scanned image and the specification of how the document was scanned (i.e. scanning parameters) and, in the network Scanning Architecture, this information is provided via the Job Log whereby the Printing system consumes the raw scanned image and adjusts the image quality; and (c) at a network proxy server thereby requiring that the proxy Image Interoperability server has access to the scanned image, the specification on how the document was scanned (i.e. Job Log) and the target printers' device profiles wherein the proxy server submits the job to the print system after it adjusts for image quality.

The architecture does not specify a mechanism for transport of the documents between the various subsystems thereby providing the benefit that a particular implementation be free to choose the transport that best fits the environment. For example, the documents and the Job Log, may by placed on a proxy server via ftp and the proxy server may use the "lpr" print protocol for printing. In the preferred embodiment, a transport model is preferred which leverages the existing applications built based on the Network Scanning Architecture.

FIG. 1 illustrates a system configuration where an intermediate image interoperability proxy server is used to configure a Scan to Print solution based on the Network Scanning Architecture. In this particular embodiment, the DCS scans the documents and places them in some document repository. The repository may be co-resident with the Image Interoperability service on the same server. The IIS accesses the repository and retrieves the documents, it then adjusts for image quality and submits the modified document for printing to a printer. The Image Interoperability Server preferably has access to various print protocols such as Solis.x print clients that enable printing on Docutech production printers.

Attention is directed to the table below that provides a table that illustrates a comparative evaluation of some of the benefits associated with providing an Image Interoperability solution at a printer, a scanner, or a proxy server.

| Criterion | Image Tuning at Scanner or Printer | Image Tuning at a proxy server |
| --- | --- | --- |
| Cost | | In a distributed environment, proxy solution provides the best cost alternative since only one NIQS board will be bought by a customer. |
| Server Cost | In an environment where only one DCS device may be present, this solution is more cost effective since the cost associated with providing a server can be eliminated (barring the fact that a server shall not be required by any of the value added solutions that a DCS may provide. | In an environment where multiple DCS devices are installed, the cost of a server based solution should be calculated. |
| Extensibility | | The proxy server affords highest level of extensibility in a distributed environment where one server can tune images for a heterogeneous set of printers and scanners. |

In the preferred embodiment, it is recommended that a proxy server solution based on the outlined table when multiple DCS and printing systems be employed in a network environment.

Image Interoperability Service Interface (Interoperability Parameters)

A set of objects that constitute an Image Interoperability Interface between a scanning and a printing subsystems is described. The interface specifies: (a) the input document format; (b) the output document format and the syntax and the semantics of the parameters that describe; (c) how the document was scanned; and (d) the target printer profile. The Image Interoperability Service consumes a TIFF file that represents one page of a scanned document as input and produces an associated TIFF file for output. The architecture does not constrain the choice of image file formats.

The set of parameters that describe how the document is scanned are found in the Job Log associated with the Scan to Print job in this architecture. The syntax and the semantics of the Job Log can be found in the Network Scanning Architecture.

The device profile for a target printer can be extracted from the printer's Device Definition Service (DDS) entry in a Network Directory Service. The Network Scanning Architecture describes a model for representing a DDS. The target device profile is a part of the DDS for that device. It describes a set of parameter values that when selected as specified produce the best quality image on that printer. Preferably, these parameters are:
Resolution
BitsPerPixel
ScanTargetDestination
HalftoneMethod
HalftoneScreen
HalftoneCellLength, HalftoneCellWidth and HalftoneCellThresholds
TRCTonalCompensation
TRCTonalCompensationData
TRCImageInversion
PhotometricInterpretation

Image Interoperability Server Architecture

In this section, an architecture is described for an Image Interoperability server that leverages the existing NIQS (Network Image Quality Server) and Network Scanning Architecture having the benefit of providing a framework that is quick to implement and with small additional developmental cost.

Figure 2:
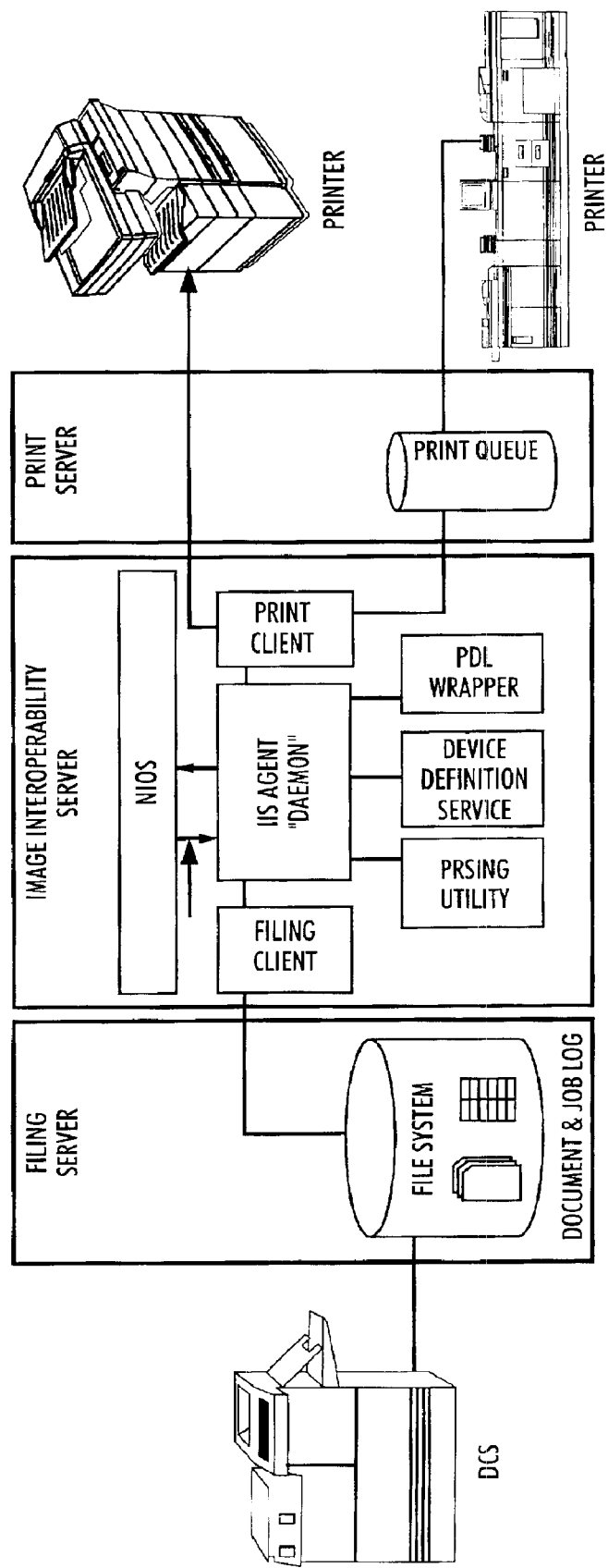
FIG. 2 is an Image Interoperability Server Architecture based on NIQS (Network Image Quality Server) and a Network Scanning Architecture platform.

FIG. 2 represents an Image Interoperability Server Architecture based On NIQS (Network Image Quality Server) and Network Scanning Architecture platform. The principals of the system operations are as follows:

Network File Server: After a walk-up user has submitted a Scan to Print job (see introduction for a description of the user operational model), the DCS places the scanned document as well as the job log associated with the specified Scan to Print job on a network file server. For simplicity, it is assumed that the file server and the Image Interoperability server are co-resident on the same platform although this is not a requirement and, as long as the Image Interoperability server can access the network file server via an established protocol (e.g. NFS, ftp, Novel filing, http), the architecture holds.

Image Interoperability Server (IIS) Agent

The Image Interoperability agent (aka, "daemon") polls a specified directory on the file server for new Scan to Print jobs. Upon arrival of a new Scan to Print job, the agent retrieves the scanned document and the job log and prepares them for further processing. Further processing includes: (a) accessing the parsing utility to parse the Job Log and extract the characteristics of the scanning service used to produce the document; (b) accessing the Device Definition Service to obtain the device profile for the specified printer; (c) submitting the scanned document as well as the scanning and printing devices' profiles to the NIQS; and (d) submitting the modified image from the output of the NIQS to the print server.

Parsing Utility: The Image Interoperability Server shall use the parsing utility to parse (a) the Job Log associated with the scanned document and (b) the Device Definition File if the Device Definition Service has a file-based implementation.

Device Definition Service (DDS): The Image Interoperability Server uses the Device Definition Service to obtain the Device Profile for an intended and/or specified printer. The Device Profile for a printer specifies a set of parameter values that the NIQS must use to process the input scanned image to produce an output scanned image that has the best image quality if printed on the specified printer. This is preferred in order to provide the Device Definition Service as part of Network directory Services (e.g. LDAP, yellow pages, DNS, etc.). The current implementation of the Device Definition Service is file-based and is commonly referred to as a Device Definition File (DDF) in the Network Scanning Architecture.

NIQS (Network Image Quality Server)

Print Server: After the NIQS processes the scanned document for printing, the IIS agent submits the document for printing. Many forms of printing are possible. The output of the NIQS contains a set of scanned images. Currently, these images are captured in TIFF file format. If the specified printer is capable of consuming TIFF files directly, then the IIS agent can submit the print job via an appropriate print driver for that device that is loaded on the IIS server. If the document is to be printed on a printer that cannot consume TIFF files directly, the TIFF images need to be embedded (or the raster image part directly) in a PDL format. Then, the agent may submit the job for printing either (a) via an appropriate PDL driver or (b) by placing the print-ready file in an appropriate print-queue (e.g. lpr queue) and allow print service (e.g. lPr) to print the document.

In summary, what is presented is a system and method that enables scan to print services. In one embodiment, Document Reproduction System (DRS) has at least one scan to print job template specifying at least one recipient and at least one printing device. A storage pool service is also provided for storing the job template that is accessible by at least one printing device. A scanner is utilized for receiving a digitized version of a document to be manipulated by the specified job template parameters. The DRS performs the specified operations on the digitized document in accordance with the job template parameters and then the document is forwarded to the recipient's designated printing device. The method of enabling Scan to Print services for a Document Reproduction System (DRS) has the steps of first creating a scan to print job template specifying at least one recipient and at least one printing device. The created job template is then stored preferably in a pool service accessible by at least one output device. The method further includes the step of selecting a job template from said pool service then placing at least one document on the DRS feeder to be scanned into the system. After scanning, the document is operated on by the DRS in accordance with the job template parameters specified therein and then it is forwarded to the recipient's printing device as specified by the job template. In another embodiment, the user selects a job template from a set of pre-defined job templates in accordance herewith.

A method is also disclosed for enabling Image Operability Services is also presented for tuning a scanned image to a specified printing device for enhanced image quality output. The method generally has the steps of first receiving a scanned image in digitized format and reading a specification of how the image was scanned including the input document format; the output document format, syntax, and parameter semantics. Loading a device profile of the target printing system as input wherein the parameters that define the enhanced print quality for a printing system are specified by the device profile of that system. Producing an output image such that when printed on the target printer, it produces enhanced quality output. In an alternative embodiment, the method further comprises the step of re-sampling the scanned image if the resolution of the primary system does not match that of the scanning system in order to re-screen the scanned image halftones to the ones that are suitable for the designated printing system and to adjust the color gamut of the scanned image to match that of the printing system.

While the invention is described with reference to a particular embodiment, this particular embodiment is intended to be illustrative, not limiting. Various modifications may be made without departing from the spirit and scope of the invention as defined in the amended claims. Modifications and alterations will occur to others upon reading and understanding this specification; therefore, it is intended that all such modifications and alterations are included insofar as they come within the scope of the appended claims or equivalents thereof.

What is claimed is:

1. A method of enabling scan to print services for a document reproduction system, comprising:

creating a scan to print job template, the job template defining job parameters of a print job including a recipient and a printing device;

storing the created job template in an accessible pool service;

selecting a job template from the pool service;

scanning, using the document reproduction system, a document and converting the document into a digital document;

performing operations, specified by the job parameters of the selected job template, upon the digital document to create a manipulated digital document; and forwarding the manipulated digital document to the printing device specified by the selected job template.

2. The method as in claim 1 wherein the selected job template further comprises print quality options and delivery preferences.

3. The method as in claim 1 wherein the creation of job templates is restricted to a privileged user.

4. The method as in claim 1 wherein the creation of job templates comprises selecting a pre-defined job template from a set of templates.

5. The method as in claim 1 wherein the selection of a job template includes selecting parameters that modify a document reproduction system control functions.

6. The method as in claim 1 further comprising combining parts of different scanned documents into a single output document forwarded to a printing device.

* * * * *